United States Patent [19]

McAuley et al.

[11] Patent Number: 5,386,413
[45] Date of Patent: Jan. 31, 1995

[54] FAST MULTILEVEL HIERARCHICAL ROUTING TABLE LOOKUP USING CONTENT ADDRESSABLE MEMORY

[75] Inventors: Anthony J. McAuley, Bloomfield; Paul F. Tsuchiya, Lake Hopatcong; Daniel V. Wilson, Rockaway Township, Morris County, all of N.J.

[73] Assignee: Bell Communications Research, Inc., Livingston, N.J.

[21] Appl. No.: 34,444

[22] Filed: Mar. 19, 1993

[51] Int. Cl.⁶ .................... H04Q 11/00; H04L 12/56
[52] U.S. Cl. .................................. 370/54; 370/58.2; 370/60; 364/253.2
[58] Field of Search .............. 370/54, 58.2, 60, 60.1, 370/68.1, 85.13, 85.14, 85.6, 94.1, 94.2, 94.3, 110.1; 379/220, 229, 242, 243, 244, 246; 340/825, 52.825, 53.825.5, 825.51; 364/253, 253.1, 253.3; 365/49

[56] References Cited

U.S. PATENT DOCUMENTS

| | | | |
|---|---|---|---|
| 4,723,224 | 2/1988 | Van Hulett et al. | 365/49 |
| 5,200,953 | 4/1993 | Spatafore et al. | 370/85.14 |
| 5,329,618 | 7/1994 | Moati et al. | 370/85.13 |

OTHER PUBLICATIONS

A. McAuley and C. Cotton, *A Self-Testing Reconfigurable CAM*, IEEE Journal of Solid State Circuits, Mar. 1991, vol. 26, No. 3, pp. 257–261.

H. Yamada, Y. Murata, T. Maeda, R. Ikeda, K. Motohashi, and K. Takahashi, *Real-Time String Search Engine LSI for 800-Mbit/Sec LANs*, Proceedings of the IEEE Custom Integrated Circuits Conference, 1988, pp. 21.6.1–21.6.4.

L. Chivin, and R. Duckworth, *Content Addressable and Associative Memory: Alternatives to the Ubiquitous RAM*, IEEE Computer Magazine, Jul. 1989, pp. 51–64.

M. Motomura et al., "A 1.2-Million Transistor, 33 MH₂, 20-bit Dictionary Search Processor with a 160kb CAM,", 1990 IEEE International Solid State Circuits Conf., pp. 90–91, Feb. 1990.

H. Kodata, "*An 8kb Content-Addressable and Reentrant Memory*," 1985 IEEE International Solid State Circuits Conf., pp. 42–43, Feb. 1985.

T. Ogura et al., "*A 4-kbit Associative Memory LSI*," IEEE Journal of Solid-State Circuits, Sc-20, No. 6, pp. 1277–1281, Dec. 1985.

*Primary Examiner*—Douglas W. Olms
*Assistant Examiner*—Hassan Kizou
*Attorney, Agent, or Firm*—Leonard Charles Suchyta; James W. Falk

[57] ABSTRACT

A switch memory 100 for implementing a multilevel hierarchical routing table in a switch is disclosed. The switch memory 100 includes a plurality of mask circuits 120, 121 and 122, which each correspond to one level of the multilevel hierarchy. Each mask circuit 120, 121 and 122 receives a destination address of an incoming call or packet and masks out portions of the received destination address which do not correspond to the level of the hierarchy with which the mask circuit 120, 121 or 122 is associated. A memory array 130, 131 or 132 corresponding to each mask circuit 120, 121 or 122, is provided which is capable of storing a table of entries including an output port entry and a corresponding destination address of one level of the multilevel hierarchy of destination addresses. Additionally, each memory array 130, 131 or 132 is capable of comparing, in parallel, non-masked portions of the masked destination address outputted from the corresponding mask circuit 120, 121 or 122 with corresponding portions of each destination address of each table entry stored therein. Finally, the switch memory 100 includes a prioritizer 150 for enabling the output of an output port entry of a matched table entry from the memory array 130, 131 or 132, storing destination addresses of the lowest level in the hierarchy, in which a match occurred.

13 Claims, 4 Drawing Sheets

FAST MULTILEVEL HIERARCHICAL ROUTING TABLE LOOKUP USING CONTENT ADDRESSABLE MEMORY

FIELD OF THE INVENTION

The present invention relates to efficiently routing calls or packets in a communications network to their appropriate destinations. More particularly, the present invention relates to a communications network switch which quickly determines the appropriate output port onto which a received packet or call should be routed depending on the packet's or call's destination address. To determine the output port, the central office switch searches a multilevel hierarchical routing table of entries stored in a plurality of content addressable memories (CAMs).

BACKGROUND OF THE INVENTION

A communications network 10 is depicted in FIG. 1. The network 10 has a number of switches A,B,C,D,E,F,G,H,I which are interconnected to one another by trunks or buses 11. Individual units of customer premises equipment or terminals 12 or 16 at individual sites or subscriber locations 19 or 20, respectively, are connected to particular switches A or I via a subscriber loop or communication link 14 or 18.

A call originating at the subscriber location 19 and destined for the subscriber location 20 is transmitted to the local switch A via the subscriber loop 14. From the switch A the call may be routed to the switch E, from switch E to the switch F and from the switch F to the switch I. At the switch I, the call is transmitted to the subscriber location 19 via the subscriber loop 18.

Illustratively, calls transmitted between switches may be organized into packets. An illustrative packet is shown in FIG. 2. As depicted, the packet is a data structure containing a header and user data. The header may include a destination address which typically is simply the identification number of a site and a particular user or telephone number of the called subscriber location. The user data portion contains the information of the call.

The central function of any communications network switch, such as the switches A-I, is to route a call or packet to the appropriate destination. When a call or packet is received at the switch I, its destination address is determined. Next, the switch I routes the call or packet to an output port designated to calls with the particular destination address of the call or packet. FIG. 3 depicts a switch 50 having a plurality of input ports 51-1, 51-2, ..., 51-n and a plurality of output ports 52-1, 52-2, ..., 52-n. Calls or packets originating at a subscriber line or another switch are received at one of the input ports 51-1, 51-2, ..., 51-n. Such calls or packets are outputted onto the appropriate output port 52-1, 51-2, ..., 52-n depending on the destination address of the call or packet.

For purposes of convenience, hierarchical switching is discussed below using the example of a telephone network with central office switches. However, the discussion applies analogously to other communication networks such as private branch exchange networks (PBX's) or local area networks (LANs).

In the United States, each subscriber location has a telephone number comprising an area code (three digits) a local exchange or NNX number (three digits) and a subscriber line number (four digits). Consider the case where the subscriber location 20 has the area code "abc", the NNX number "ghi" and the subscriber line number "uvxy".

Thus, it may be appreciated that any central office switch may receive a call having any one of a large number of destination addresses. A central office switch would be easily overwhelmed if it had to keep track of each specific destination address. However, each central office switch need only keep track of the specific destination addresses of the subscriber locations connected thereto via a subscriber line. The remaining calls are typically routed according to their area code or area code and NNX number to another central office switch. This "hierarchical" routing scheme, whereby calls are routed according to only a portion of the destination address, is typically carried out at each central office switch.

At each central office switch, all of the possible destination addresses of calls and packets are organized into a multilevel hierarchy. FIG. 4 depicts an exemplary hierarchy for the central office switch I of FIG. 1. As depicted in FIG. 4, seven destination addresses visible to the central office switch I are shown arranged in a tree structure. Each address has ten digits as before where an X digit indicates a wild card digit which may be any number. The highest level in the hierarchy contains the destination address XXX-XXX-XXXX which matches every possible destination address of a call or packet. The next highest level in the hierarchy contains the destination addresses 908-XXX-XXXX, 201-XXX-XXXX and 212-XXX-XXXX which match each possible destination address having one of three area codes, i.e., 201, 908 or 212. The next highest level in the hierarchy contains the destination addresses 201-829-XXXX and 201-867-XXXX which match each possible destination address within one of two local exchanges within the 201 area code, i.e., 829 or 867. Finally, the lowest level in the hierarchy contains the destination address 201-829-4698 which matches only the destination address having the specific subscriber location 4698 in the local exchange 829 of the area code 201.

In routing a call or packet according to a multilevel hierarchy, the destination address of the call or packet is matched to destination addresses in the hierarchy. The call or packet is then routed onto the output port assigned to the destination address having the lowest level in the hierarchy which matches the destination address of the call or packet. For example, consider a packet with the destination address 201-829-4484. The destination address of this packet matches destination addresses in three levels of the hierarchy, 201-829-XXXX, 201-XXX-XXXX and XXX-XXX-XXXX. The matching destination address on the lowest level of the hierarchy is 201-829-XXXX. In this case, the call or packet destined to the address 201-829-4484 is routed onto an output port assigned to the destination address 201-829-XXXX. Similarly, a call with the destination address 908-829-4698 matches the destination addresses in two levels of the hierarchy, XXX-XXX-XXXX and 908-XXX-XXXX (the entry 201-829-4698 does not match this second address in the hierarchy as any mismatched digits result in a complete mismatch). The matching destination address of the lowest level in the hierarchy is the destination address 908-XXX-XXXX. Thus, the call or packet destined to the address 908-829-4698 is routed onto the output port assigned to the destination address 908-XXX-XXXX.

Illustratively, each central office switch consults a multilevel hierarchical routing table to determine the appropriate output port onto which a received call or packet should be routed. An exemplary multilevel hierarchical routing table (Table 1) is shown below.

TABLE 1

| Address | Output Port |
| --- | --- |
| 201-829-4698 | Port A |
| 201-829-XXXX | Port B |
| 201-867-XXXX | Port C |
| 201-XXX-XXXX | Port D |
| 908-XXX-XXXX | Port E |
| 212-XXX-XXXX | Port F |
| XXX-XXX-XXXX | Port G |

The routing table comprises a plurality of pairs. The first element of each pair is a destination address. As depicted, the routing table includes each of the destination addresses of the multilevel hierarchy depicted in FIG. 4. Associated with each destination address is a corresponding output port entry indicating an output port onto which calls or packets destined for the respective destination address should be routed. For example, all packets or calls with a destination address having a 908 area code are routed onto the output port E.

Several conventional methods have been proposed for retrieving the appropriate output port entry from such a multilevel hierarchical routing table. In a first conventional method called linear search, each pair of routing table entries are stored in a memory such as a RAM. To locate the best match, the destination address of each pair stored in the RAM is successively retrieved and compared to the destination address of the call or packet. The call or packet is then routed onto the output port indicated by the output port entry corresponding to the matching destination address entry of the lowest level in the hierarchy. While such a solution is simple and inexpensive, the execution time is on the order of $O(N)$ where N is the number of pairs of entries in the routing table. Thus, as N increases, the execution time of the above method increases in a linear manner.

In a second faster conventional approach, the pairs of destination addresses and output port entries are organized into a tree structure such as a binary tree, patricia tree or trie tree. The time required to search such a tree is of the order of $O(\log_p N)$ where the log base p depends on the type of tree used to store the routing table (e.g., for a binary or patricia tree, p=2). The log base p may be increased by selecting a different tree structure for storing the routing table. However, if the destination addresses are sparsely distributed over the domain of possible destination addresses, as is typical for telephone destination addresses, the resulting tree may require an unacceptably large memory. Furthermore, although faster than the first aforementioned routing table implementation, the second solution may still be too slow for use in a high speed central office switch where the allotted search time may be no more than a fraction of the time to transmit a packet on a high speed link.

In a third conventional solution, a hashing function may be used to convert the destination address of the call or packet to an index within a reasonably small range. The index, in turn, may be used as a memory address to access a memory such as a RAM to retrieve a corresponding output port entry. The third solution provides for quick routing table searches for most cases. However, in a worst case scenario, the search time may be greater than the aforementioned tree search solution because the hashing function may produce the same index value for more than one destination address. Furthermore, the execution time of the third solution is a function of the size of the memory used and the number of potential destination addresses which must be searched at any given time. The routing table may be relatively small because of the hierarchical organization of the destination addresses (i.e., the number of routing table entries is on the order of several tens or hundreds). However, the potential number of addresses to be searched can be very large. The number depends on calling traffic patterns which are difficult to predict, especially for emerging data networks. Therefore, the amount of memory or search time for this solution may be very large.

It is also possible to simply use each destination address as a memory address for a RAM. The destination address is inputted on the memory address lines of a RAM and a corresponding output port entry stored in the addressed memory location is retrieved. In this solution, a RAM must be provided which is big enough to have a separately addressable memory location for each conceivable destination address. Thus, the size of such a RAM is extremely large despite having relatively few destination address entries in the routing table.

The prior art has also suggested using a content addressable memory or CAM in a high speed packet switch to translate a packet destination address into an output port. See A. McAuley & C. Cotton, "A Self-Testing Reconfigurable CAM," I.E.E.E. J. of Solid State Circuits, vol 26, no. 3, p. 257-61, Mar., 1991; H. Yamada, Y. Murata, T. Maeda, R. Ikeda, K. Motohashi & K. Takahashi, "Real-Time String Search Engine LSI for 800-Mbit/sec LANs," Proc. I.E.E.E. Custom Integrated Circuits Conference, p. 21.6.1-21.6.4, 1988; L. Chivin & R. Duckworth, "Content Addressable and Associative Memory: Alternatives to the Ubiquitous RAM," I.E.E.E. Computer Magazine, p. 51-64, Jul., 1989. A conventional CAM has the same read and write operations as a RAM. In addition, a CAM has a search operation in which a data entry inputted to the CAM is masked, in part, by a mask. The non-masked portion of this data entry is compared, in parallel, to each entry stored in a memory array of the CAM. If the non-masked bits of the inputted data match corresponding bits of an entry stored in the memory array, the contents of the entry are outputted from the CAM.

A CAM may also be designed so that only a first portion of each entry stored in the memory array is compared to the masked inputted data and so that only a second portion of an entry is outputted if a match occurs. Thus, each entry may contain a first field which is compared to non-masked portions of inputted data and a second field which is outputted if a match occurs. Typically, such a CAM is an address-less CAM, which does not use addresses for writing to or reading from the memory array. Rather, during a write operation, only the data which is to be written in the CAM is inputted thereto. This data is stored in the next available location in the memory array of the CAM. When a search is performed, only a flag is returned if the first field of an entry matches the masked inputted data. However, the CAM keeps track of the matching entry which may be retrieved by executing a read operation (without a memory address) after the search. The advantage of the address-less CAM is that addresses are entirely dispensed with thereby simplifying overall system design.

Although the prior art has suggested using a CAM for translating destination addresses to output ports, there are no conventional implementations of a multilevel hierarchical routing table using a CAM. Thus, the prior art proposals do not provide for routing a call or packet with a destination address that matches several destination address entries in the routing table (of different levels in a hierarchy of destination addresses).

It is therefore an object of the present invention to implement a multilevel hierarchical routing table in a switch. It is another object of the present invention to route calls or packets onto the output port indicated by the output port entry corresponding to the destination address, of the lowest level of the hierarchy, which matches the destination address of the call or packet. It is a further object of the present invention to provide a fast implementation, which conserves storage space, for routing calls and packets through a switch according to a multilevel hierarchy of destination addresses.

SUMMARY OF THE INVENTION

These and other objects are achieved by the present invention which provides a switch memory for implementing a multilevel hierarchical routing table. The memory includes an input for receiving the destination address of a call or packet and an output for outputting an output port entry indicating the output port of the switch onto which the call or packet is to be routed. The memory also has a number of content addressable memories, each of which is associated with one level of the multilevel hierarchical routing table. Each content addressable memory includes a memory array for storing routing table entries, which entries each include a destination address and an output port entry. Each of the content addressable memories also includes a mask circuit for masking out portions of the destination address received at the input. The address portions which are masked out do not correspond to the particular level of the hierarchy with which the content addressable memory is associated. When the non-masked portion of the destination address matches a corresponding portion of a destination address of an entry stored in the memory array, an output port entry contained in the matched entry is outputted from the content addressable memory. The switch memory also has a prioritizer for prioritizing the content addressable memories. The prioritizer selects only the output port entry outputted from the content addressable memory associated with the lowest level in the hierarchy in which a match occurred. The selected output port entry is then outputted from the output of the switch memory.

In operation, each mask circuit uses a different mask, which masks provide for wild card pattern matching of the call or packet destination address with the destination addresses stored in the corresponding content addressable memory. In other words, only the non-masked bits of the call or packet destination address are compared with corresponding bits of each destination address of each entry stored in a memory array. As such, the bits of each destination address of each entry corresponding to the masked bits of the inputted data function as wild card or "don't care" bits.

The mask used in each mask circuit is selected according to the level in the hierarchy of the destination addresses stored in the corresponding content addressable memory. For instance, consider the aforementioned routing table (Table 1). Suppose a first content addressable memory stores an entry including the destination address 201-829-4698, of the lowest level in the hierarchy, and corresponding output port entry A. Similarly, the destination addresses 201-829-XXXX and 201-867-XXXX of the next lowest level of the hierarchy, and their corresponding output port entries B and C, are stored in a second content addressable memory. The destination addresses 201-XXX-XXXX, 908-XXX-XXXX and 212-XXX-XXXX, of the next lowest level of the hierarchy and their corresponding output port entries D, E and F are stored in a third content addressable memory, and so on. The mask circuit corresponding to the first content addressable memory permits all ten digits of the destination address of the call or packet to be compared to the destination addresses stored therein. However, the mask circuit corresponding to the second content addressable memory only permits the area code and NNX number to be compared to the destination addresses stored in the second content addressable memory. This is because the destination addresses stored in the second content addressable memory have wild card local subscriber number digits. Similarly, the mask circuit corresponding to the third content addressable memory only permits the area code to be compared to the destination addresses stored in the third content addressable memory. This is because the destination addresses stored in the third content addressable memory have wild card NNX and local subscriber number digits.

Illustratively, each memory array of each content addressable memory compares the masked destination address to the destination address of each entry stored in the memory array in parallel. In other words, each memory array determines if a matching entry exists in a small amount of time. The output port entry of a matched entry is then outputted from the memory array.

It is possible for a match to occur in several content addressable memories contemporaneously. In such a case, the prioritizer circuit only permits the content addressable memory storing the destination addresses of the lowest priority, in which a match occurred, to output its output port entry. Thus, only the output port entry corresponding to the matching destination address of the lowest level of the hierarchy is retrieved.

DETAILED DESCRIPTION OF THE INVENTION

Figure 5:
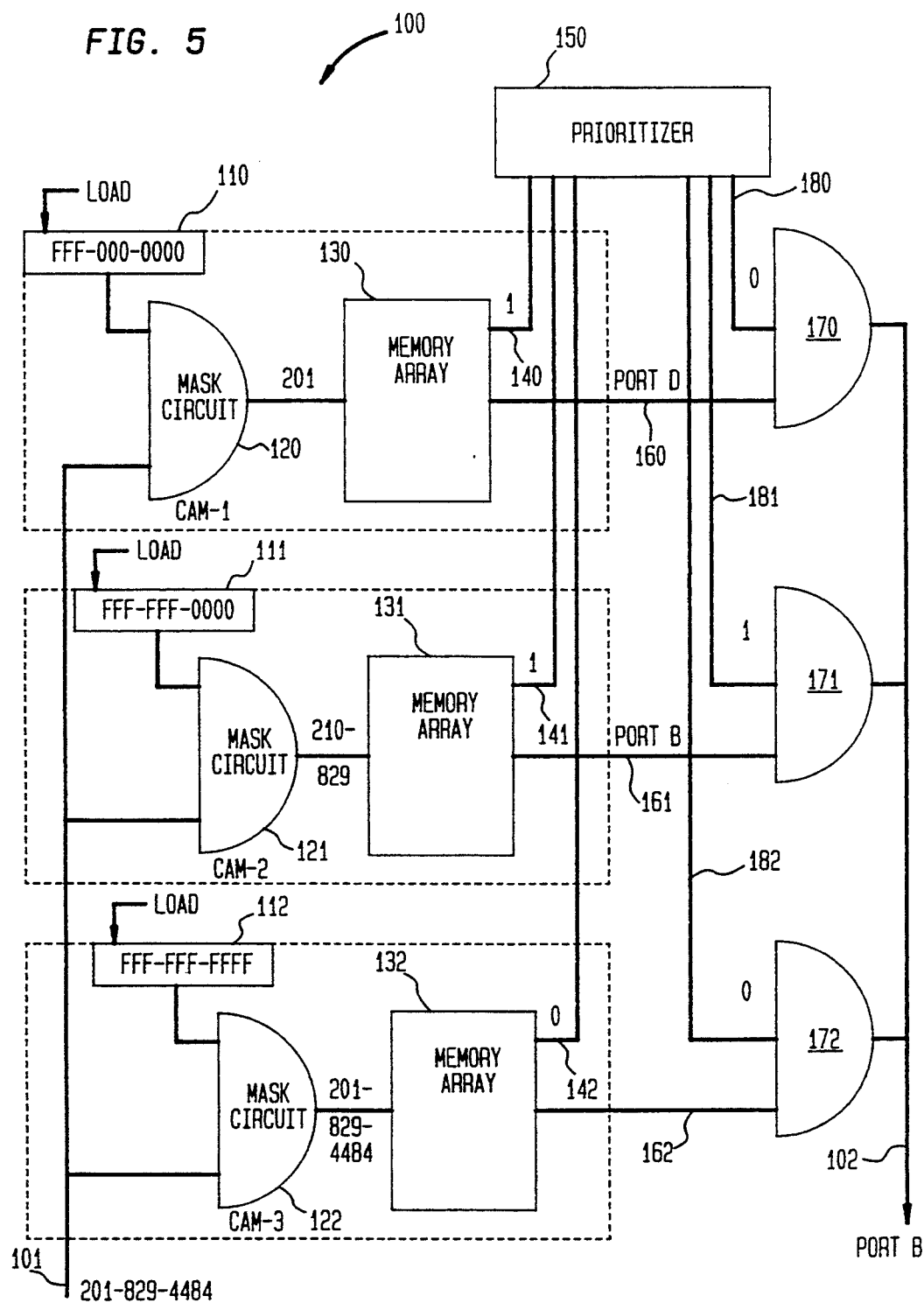
FIG. 5 depicts a central office switch memory for storing a hierarchical routing table according to the present invention.

Referring now to FIG. 5, a memory 100 in a central office switch according to the present invention is depicted. The memory 100 stores a hierarchical routing table. Each entry of the routing table comprises a destination address and a corresponding output port entry. When the central office switch receives a call or packet, the destination address of the call or packet is inputted to the memory 100 at the input 101. The memory 100 determines each destination address stored in the routing table therein which matches the inputted destination address of the call or packet. The memory 100 then outputs, at the output 102, the output port entry associated with the matching destination address of the lowest level in the hierarchy of destination addresses. The received call or packet is then routed out of the central office switch via the output port indicated by the retrieved output port entry.

The memory 100 is shown having three CAMs labeled CAM-1, CAM-2 and CAM-3 although any number of CAMs may be provided. Each CAM, i.e., CAM-1, CAM-2 or CAM-3, illustratively has a masking circuit 120, 121 or 122, respectively, each of which receives the inputted destination address. Each CAM, i.e., CAM-1, CAM-2 and CAM-3, has its own separately loadable mask register 110, 111 or 112, respectively, for providing a mask to the masking circuit 120, 121 or 122, respectively. The output of the masking circuit 120, 121 or 122 is inputted to a memory array 130, 131 or 132, respectively. Each memory array 130, 131 or 132 receives the masked output of the masking circuits 120, 121 or 122 and outputs a flag on the line 140, 141 or 142 to a prioritizer circuit 150 when there is a match between the masked output and a destination address of a routing table entry in the particular CAM. In addition, the memory arrays 130, 131 or 132 may output entries stored therein on the lines 160, 161 or 162 to an output enable circuit 170, 171 or 172, respectively. The output enable circuits 170, 171 and 172 additionally each receive an enable control signal from the prioritizer circuit 150 via the line 180, 181 or 182, respectively. The output enable circuits enable the outputting of an output port entry received on a corresponding line 160, 161 or 162 via the output 102 depending on the enable control signal received from the prioritizer 150 on the line 180, 181 or 182, respectively.

Figure 4:
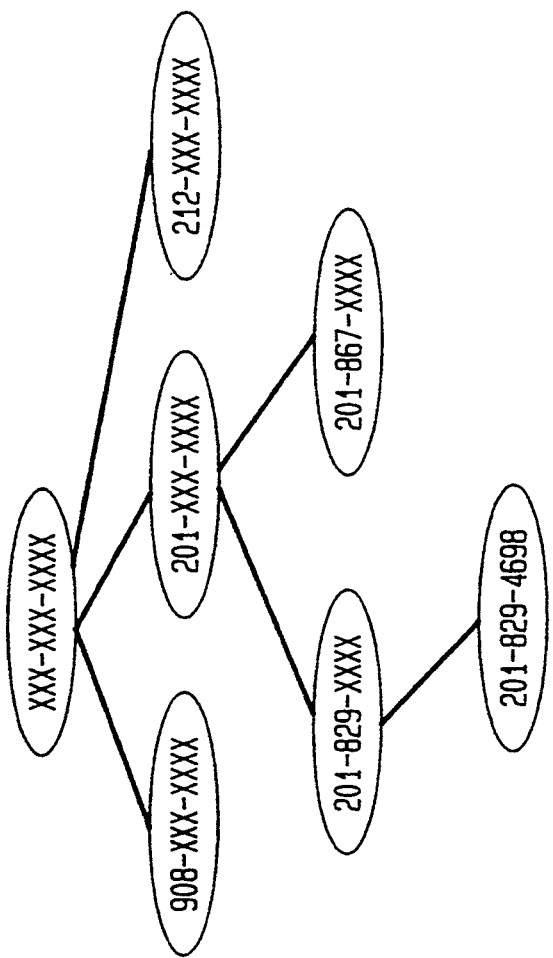
FIG. 4 depicts a destination address hierarchy at a central office.

The operation of the circuit 100 for implementing a multilevel hierarchical routing table is now discussed. Consider a hierarchy similar to that shown in FIG. 4 without the highest level destination address that matches every call or packet destination address (i.e., without the destination address XXX-XXX-XXXX). A routing table for implementing such a hierarchy is depicted below in table 2.

TABLE 2

| Address | Output Port |
|---|---|
| 201-829-4698 | Port A |
| 201-829-XXXX | Port B |
| 201-867-XXXX | Port C |
| 201-XXX-XXXX | Port D |
| 908-XXX-XXXX | Port E |
| 212-XXX-XXXX | Port F |

As depicted, each entry of the Table 2 is a pair containing a destination address and a corresponding output port entry. The destination addresses may be ordered according to a multilevel hierarchy with destination addresses having a particular area code, NNX number and local subscriber number (i.e., 201-829-4698) on the lowest level. The next to the lowest level includes destination addresses having a particular area code and NNX number and any local subscriber number (i.e., 201-829-XXXX and 201-867-XXXX). Finally, the highest level in the hierarchy includes numbers having a particular area code and any NNX number and local subscriber number (i.e., 201-XXX-XXXX, 908-XXX-XXXX and 212-XXX-XXXX).

Initially, the above destination address and output port entry pairs from Table 2 are loaded into the CAMs, i.e., CAM-1, CAM-2 or CAM-3. Each pair is loaded into a different CAM depending on its level in the hierarchy. For example, the lowest level pair <201-829-4698, Port A> is stored in CAM-3. The next to lowest level pairs <201-829-XXXX, Port B> and <201-867-XXXX, Port C> are stored in CAM-2. Finally, the highest level pairs <201-XXX-XXXX, Port D>, <908-XXX-XXXX, Port E> and <212-XXX-XXXX, Port F> are stored in CAM-1.

Next, the memory 100 may load appropriate masks, as shown in Table 3, into the mask registers 110, 111 or 112.

TABLE 3

| CAM | Mask | Stored Addresses |
|---|---|---|
| CAM-3 | FFF-FFF-FFFF | 201-829-4698 |
| CAM-2 | FFF-FFF-0000 | 201-829-XXXX |
|  |  | 201-867-XXXX |
| CAM-1 | FFF-000-0000 | 201-XXX-XXXX |
|  |  | 908-XXX-XXXX |
|  |  | 212-XXX-XXXX |

The purpose of the mask is to ensure that only particular digits of the destination address inputted at the input 101, which correspond to non-wild card digits of each destination address stored in the corresponding CAM, are compared thereto. Illustratively, each mask is a ten digit sequence of hexadecimal digits. An F digit causes each bit of a corresponding digit of a destination address inputted at the input 101 to be compared to a corresponding digit of a destination address of each entry stored in a CAM. On the other hand, a 0 digit prevents each bit of a corresponding digit of a destination address inputted at the input 101 from being compared to a corresponding digit of a destination address of each entry stored in a CAM. Thus, in CAM-3, the mask FFF-FFF-FFFF is used so that each digit of the destination address inputted at the input 101 is compared to the destination addresses of the entries stored in the CAM-3. In CAM-2, the mask FFF-FFF-0000 is used so that only the area code and NNX number are compared to the destination addresses of the entries stored in the CAM-2. Finally, in CAM-1, the mask FFF-000-0000 is used so that only the area code is compared to the destination addresses of the entries stored in the CAM-1. It may be appreciated that each mask is selected in accordance with the level of the destination addresses stored in the corresponding CAM to ensure that the correct wild card pattern matching is carried out in that particular CAM.

Figure 1:
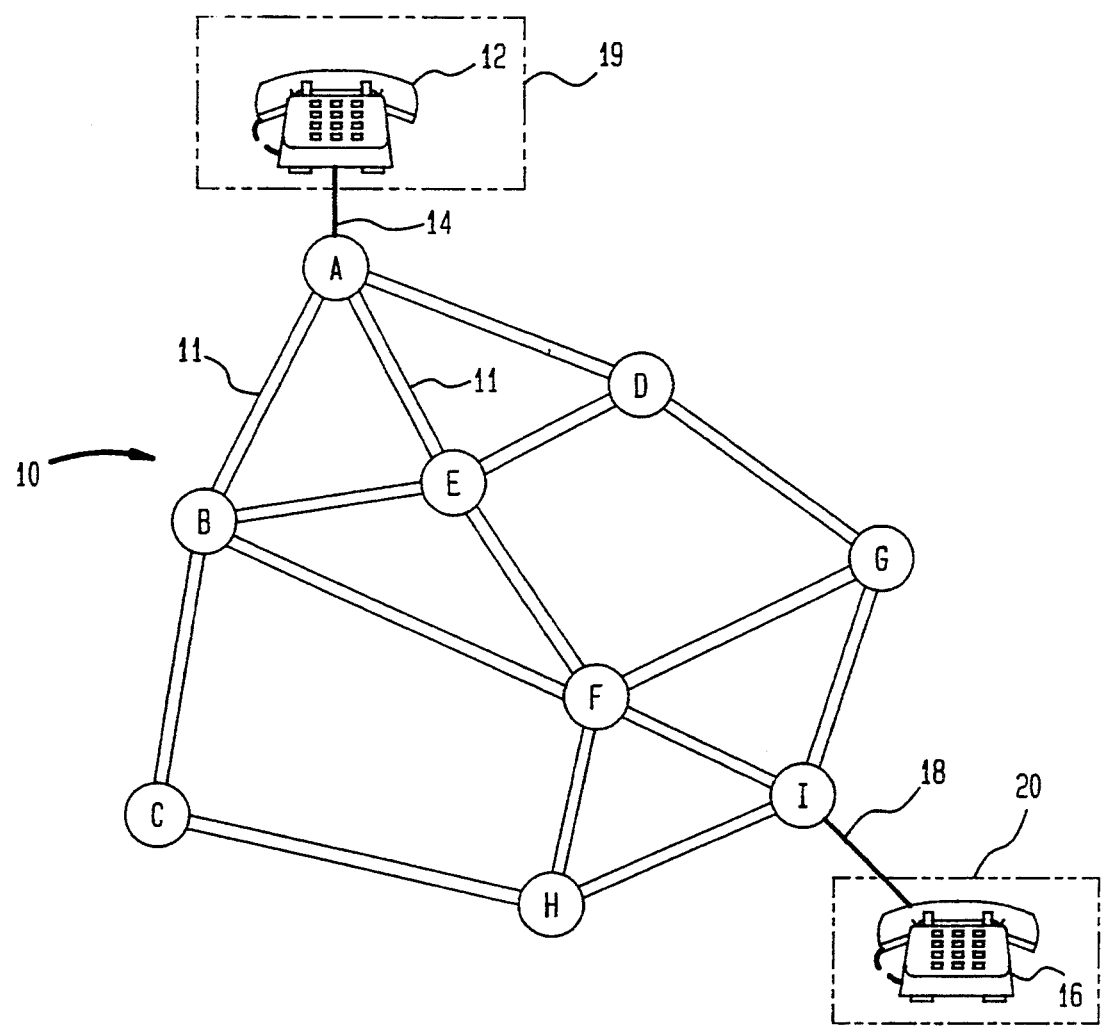
FIG. 1 depicts a conventional telecommunications network.
Figure 2:
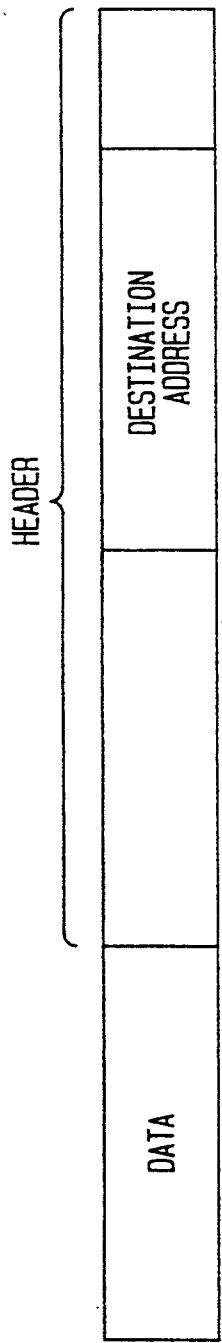
FIG. 2 depicts a packet.
Figure 3:
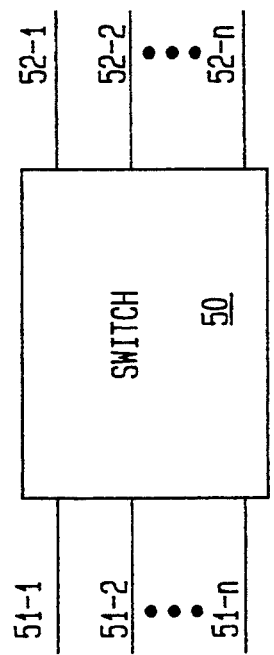
FIG. 3 depicts a conventional central office switch.

After the routing table and masks are loaded into the memory 100, the central office switch is ready to use the memory 100 for routing calls and packets. When a call or packet arrives at the central office switch, its destination address is retrieved. For example, in the case of the packet depicted in FIG. 2, the destination address is simply read from the header of the packet. A search operation is then carried out on each CAM, i.e., CAM-1, CAM-2 and CAM-3, simultaneously by inputting the destination address of the call or packet at the input 101. Each mask circuit 120, 121 or 122 receives the inputted destination address and ensures that only non-masked digits thereof are compared to the corresponding digits of destination addresses stored in the corresponding memory array 130, 131 or 132. For example, if the inputted destination address is 201-829-4484, then the mask circuit 120 ensures that only the digits 201 are compared with corresponding area code digits of each destination address stored in the memory array 130. Similarly, the mask circuit 121 ensures that only the digits 201–829 are compared with corresponding area code and NNX digits of each destination address stored in the memory array 131. Furthermore, the mask circuit 122 ensures that the digits 201-829-4484 are compared with corresponding area code, NNX and local subscriber number digits of each destination address stored in the memory array 132.

In each memory array 130, 131 or 132, the masked destination address of the corresponding mask circuit 120, 121 or 122 is compared, in parallel, to the destination address of each entry stored therein. If the non-masked digits match corresponding digits of a destination address stored in the memory array 130, 131 or 132, the memory array 130, 131 or 132 outputs a match flag on the line 140, 141 or 142, respectively. In addition, the output port entry of the routing table entry containing the matching destination address is outputted on the line 160, 161 or 162.

It may be appreciated that the destination address of a received packet or call may match a destination address entry in more than one CAM. For example, the destination address 201-829-4484 matches the address 201-829-XXXX stored in CAM-2 and the destination address 201-XXX-XXXX stored in CAM-1. The prioritizer circuit 150 is provided to ensure that only the output port entry corresponding to the lowest level destination address is outputted from the memory 100. The prioritizer circuit 150 receives the flags outputted by each CAM, i.e., CAM-1, CAM-2 and CAM-3, from the lines 140, 141 and 142, respectively. The prioritizer circuit 150 selects the output of only the CAM, of the lowest level in the hierarchy, which outputs a match flag. For instance, if the destination address 201-829-4484 is inputted at the input 101, then CAM-1 and CAM-2 will output a match flag to the prioritizer circuit 150 on the lines 140 and 141, respectively. The prioritizer circuit 150 selects the output of CAM-2 because the destination addresses stored in CAM-2 are of a lower level in the hierarchy than the destination addresses stored in CAM-1.

In order to enable the output of the CAM-2, the prioritizer circuit 150 outputs an enable signal on the line 181 to the output enable circuit 171. The output enable circuit 171 also receives the output port entry (Port B, as shown in Table 2) which is outputted from the CAM-2 on the line 161. This output port entry is therefore outputted from the output 102. It may be appreciated that the output enable circuit 170 also receives the output port entry (Port D, as shown in Table 2) which is outputted from the CAM-1 on the line 160. However, because the prioritizer circuit 150 does not, in this example, output an enable signal on the line 180, the output enable circuit 170 does not output the received output port entry to the output 102. The central office switch then routes the call or packet onto the output port (i.e., Port B) indicated by the output port entry retrieved from the output 102.

It may be appreciated that the multilevel hierarchical routing table stored in the central office switch memory 100 may be updated from time to time. This may be easily accomplished by simply reloading the memory array of each CAM, i.e., CAM-1, CAM-2 and CAM-3. Again, routing table entries containing destination addresses of a particular level in the hierarchy are stored in the CAM associated with that level.

In another embodiment, one or more multiple logical CAMs are used. A multiple logical CAM is a CAM having a number of mask circuits and a memory array which may be partitioned into a number of subarrays equal to the number of mask circuits. Each mask circuit and corresponding subarray may function as a separate logical CAM, i.e., as if it were a separate CAM. Furthermore, the multiple logical CAM may include priority and output enable circuitry for prioritizing the output of each logical CAM thereof.

According to this embodiment, the multiple logical CAM is used as more than one logical CAM. For example, a multiple logical CAM is provided which may be used as at least three logical CAMs. Each routing table entry of a particular level in the hierarchy is loaded into the subarray of a logical CAM associated with that particular level of the hierarchy. The operation of this embodiment is otherwise similar to the memory 100 of FIG. 5.

Because the prioritization and output enable logic is built into the multiple logical CAMs, processing speed is increased and costs are reduced. Moreover, a typical CAM has a memory array with more storage capacity than routing table entries for any level of a hierarchical routing table. In the implementation of FIG. 5, much storage capacity in each CAM is thus never used. However, by partitioning the memory array into multiple sub-arrays, each of which is allocated to a different logical CAM, storage space in the memory array is conserved.

It is also possible to adapt the memory 100 to provide for retrieving a large block of data other than, or in addition to, the output port entry corresponding to the destination address of the packet or call. The block of data associated with each destination address is stored in a separate RAM at a particular memory address. This memory address, in turn, is stored in the central office switch memory 100 with the routing table entry containing the corresponding destination address. When a match occurs, the memory address of the routing table entry which contains the matching destination address is outputted instead of (or in addition to) an output port entry. This memory address, in turn, is used to access the RAM to retrieve the large block of data corresponding to the destination address of the call or packet.

In the above discussion, a telephone network with central office switches utilizing NANP address hierarchy is used as an example. However, the discussion also applies analogously to other address hierarchies, e.g., IP, E.164, etc., and for other types of communication networks, e.g., PBX-like networks and LANs.

In summary, a memory is disclosed for implementing a multilevel hierarchical routing table in a switch. The switch memory includes a number of mask circuits, each of which is associated with one level of a multilevel hierarchy. Each mask circuit masks out digits of a destination address of a call depending on the corresponding level in the hierarchy. The switch memory also includes a memory array corresponding to each mask circuit which stores destination addresses of the same level of the hierarchy with which the mask circuit is associated. The use of CAMs permits retrieving the output port entry corresponding to the destination address, of the lowest level in the hierarchy, which matches the destination address of a call or packet. Furthermore, because the routing table is easily stored in the CAMs, routine updates to the routing table may be performed as needed.

Finally, the aforementioned embodiments are intended to be merely illustrative. Numerous other embodiments may be devised by those having ordinary skill in the art without departing from the spirit or scope of the following claims.

We claim:

1. A memory for use in a switch in a communications network for implementing a multilevel hierarchical routing table comprising:
   an input for receiving a destination address of a call or packet,
   an output for outputting an output port entry indicating a particular output port of said switch for said call or packet,
   a plurality of content addressable memories, each content addressable memory associated with one level of said multilevel hierarchical routing table and comprising:
   a mask circuit for producing a masked destination address by masking out portions of said destination address of said call or packet received at said input which do not correspond to said one level of said routing table, and
   a memory array for storing routing table entries comprising destination addresses and corresponding output port entries for said one level of said multiple hierarchical routing table and for outputting, when each non-masked portion of said masked destination address matches corresponding portions of a destination address of a routing table entry stored in said memory array, an output port entry contained in the matched routing table entry, and
   a prioritizer for prioritizing said content addressable memories by selecting, for output from said output, the output port entry outputted from the content addressable memory associated with the lowest level in said hierarchy, in which a match occurred.

2. The memory of claim 1, wherein each memory array is capable of comparing, in parallel, said non-masked portions of said masked destination address to corresponding portions of each destination address of each routing table entry stored in said memory array.

3. The memory of claim 1 wherein said portions masked by said mask circuits correspond to wild card digits of said destination addresses stored in said memory array.

4. The memory of claim 1, wherein each content addressable memory outputs a signal to said prioritizer indicating that a match occurred therein, when said non-masked portions of said masked destination address match corresponding portions of a destination address of a routing table entry stored in said memory array, and wherein said prioritizer, in response to said signals outputted by the addressable memories, selects the output port entry outputted from the content addressable memory associated with the lowest level in the multilevel hierarchy which outputted a signal to said prioritizer.

5. The memory of claim 1 further comprising a plurality of output enable circuits, including one output enable circuit corresponding to each content addressable memory, for receiving an output port entry from said memory array of said corresponding content addressable memory and an output enable control signal from said prioritizer, and for outputting said output port entry from said output in response to said output enable signal received from said prioritizer circuit.

6. A method for routing a call or packet received in a switch in a communications network comprising the steps of:
   in each of a plurality of mask circuits, each of said plurality of mask circuits corresponding to one level of a multilevel hierarchical routing table, masking out portions of a destination address of said call or packet, which portions depend on said one level of the hierarchy to which a mask circuit corresponds,
   from each of a plurality of memory arrays, with each memory array being associated with one of said mask circuits and storing routing table entries of said corresponding one level in the hierarchy comprising destination addresses and corresponding output port entries, outputting an output port entry of a routing table entry which comprises a destination address having portions which match each corresponding non-masked portion of the masked destination address, and
   routing said call or packet onto an output port indicated by an output port entry outputted from the memory array, corresponding to the lowest level in the hierarchy, of said memory arrays which output output port entries.

7. The method of claim 6 further comprising the step of comparing in each memory array, in parallel, each non-masked portion of the masked destination address with a corresponding portion of each destination address of each routing table entry stored in said memory array.

8. The method of claim 6 further comprising the steps of:
   from each memory array, if said non-masked portions of the masked destination address match corresponding portions of a destination address of a routing table entry stored in said memory array, outputting an indication signal and said output port entry of the matched routing table entry, and
   of said memory arrays which output an indication signal, selecting only the output port entry outputted from the memory array corresponding to the lowest level in the hierarchy.

9. The method of claim 6 wherein each routing table entry stored in each memory array comprises an additional address for addressing a further bloc of data.

10. A memory for use in a central office switch for implementing a multilevel hierarchical routing table comprising a plurality of content addressable memory means, each associated with one level of said multilevel hierarchical routing table and each comprising
    mask circuit means for masking out portions of a destination address of a call or packet which do not correspond to said one level of said routing table, and
    memory array means for storing routing table entries comprising destination addresses and corresponding output port entries for said one level of said routing table and for comparing non-masked portions of the masked destination address to corresponding portions of each destination address of each routing table entry stored therein.

11. The memory of claim 10 wherein the memory array means of each of the content addressable memory means outputs an indication when there is a match between the non-masked portions of said destination address of said call or packet and the corresponding portions of a destination address of a particular routing table entry stored therein.

12. The memory of claim 11 wherein said memory further comprises a prioritizer for, in response to said indications, giving priority to the content addressable memory means of the lowest level of the hierarchy in which a match occurred.

13. The memory of claim 11 wherein one or more of said content addressable memory means are logical content addressable memories implemented as part of a multiple logical content addressable memory.

* * * * *